United States Patent [19]
Ikeda et al.

[11] Patent Number: 5,591,349
[45] Date of Patent: Jan. 7, 1997

[54] MICROORGANISM REMOVING METHOD

[75] Inventors: Akira Ikeda; Naoki Nakatsugawa; Yumiko Yoshimura; Yasuhiro Tanimura; Kenji Ezaki, all of Hyogo, Japan

[73] Assignee: Mitsubishi Denki Kabushiki Kaisha, Tokyo, Japan

[21] Appl. No.: 338,304

[22] Filed: Nov. 14, 1994

Related U.S. Application Data

[63] Continuation of Ser. No. 43,434, Apr. 5, 1993, abandoned.

[30] Foreign Application Priority Data

Apr. 28, 1992 [JP] Japan ................... 4-109401
Apr. 28, 1992 [JP] Japan ................... 4-109801

[51] Int. Cl.⁶ ................................ C02F 1/78
[52] U.S. Cl. ............ 210/760; 210/764; 210/192; 210/205
[58] Field of Search ................ 210/760, 764, 210/192, 177, 205, 765, 758; 422/186.08, 186.09, 186.1, 186.11, 186.12, 186.07, 28, 30

[56] References Cited

U.S. PATENT DOCUMENTS

| | | | |
|---|---|---|---|
| 3,805,481 | 4/1974 | Armstrong | 210/760 |
| 3,856,671 | 12/1974 | Lee et al. | 210/194 |
| 3,997,631 | 12/1976 | Matsuoka et al. | 210/192 |
| 4,100,421 | 7/1978 | Tabata et al. | 250/533 |
| 4,136,027 | 1/1979 | Sakamoto et al. | 210/760 |
| 4,172,786 | 10/1979 | Humphrey et al. | 210/760 |
| 4,352,740 | 10/1982 | Grader et al. | 210/764 |
| 4,430,306 | 2/1984 | Namba et al. | 210/192 |
| 4,453,953 | 6/1984 | Tanaka et al. | 422/186.08 |
| 4,462,965 | 7/1984 | Azuma et al. | 210/760 |
| 4,552,659 | 11/1985 | Tabata et al. | 210/177 |
| 4,767,528 | 8/1988 | Sasaki et al. | 210/177 |
| 5,075,016 | 12/1991 | Barnes | 210/760 |
| 5,145,585 | 9/1992 | Coke | 210/192 |
| 5,186,841 | 2/1993 | Schick | 210/760 |
| 5,275,742 | 1/1994 | Satchell, Jr. et al. | 210/192 |

FOREIGN PATENT DOCUMENTS

| | | | |
|---|---|---|---|
| 0330028 | 2/1989 | European Pat. Off. | |
| 55-61983 | 5/1980 | Japan. | |
| 3217294 | 9/1991 | Japan. | |
| 3296490 | 12/1991 | Japan | 210/760 |

OTHER PUBLICATIONS

Ozone Science & Engineering "Anti-Biofouling Ozone System for Cooling Water Circuits" 1985, pp. 31–46.

*Primary Examiner*—Cynthia L. Nessler
*Attorney, Agent, or Firm*—Wolf, Greenfield & Sacks, P.C.

[57] ABSTRACT

An organism deposition preventing system for removing organisms propagated in water comprises: an ozonizer for generating ozone, an ozone adsorber containing an ozone adsorbent for storing ozone generated by the ozonizer, a water-jet ejector for injecting an ozonous gas produced by desorbing ozone from the ozone adsorbent of the ozone absorber into the water, and a carbon dioxide gas source means for supplying carbon dioxide gas to be injected into the water together with the ozonous gas or in synchronism with the injection of the ozonous gas into the water. A microorganism removing method for removing microorganisms propagated in water injects a mixed gas consisting of an ozonous gas and carbon dioxide gas into the water or injects carbon dioxide gas in synchronism with the injection of the ozonous gas into the water.

6 Claims, 6 Drawing Sheets

MICROORGANISM REMOVING METHOD

This application is a continuation of application Ser. No. 08/043,434, filed Apr. 5, 1993, now abandoned.

BACKGROUND OF THE INVENTION

1. Field of the Invention

The present invention relates to a microorganism deposition preventing system for preventing clogging pipes with microorganisms or reducing the heat-exchanging efficiency of a heat exchanger by microorganisms deposited over the heat-exchanging surface of the heat exchanger, and improvements in a microorganism removing method.

2. Description of the Prior Art

While a large amount of industrial water is used for various purposes including cooling and processing in power stations and chemical plants, microorganisms and waterweed deposit in slime in pipes to clog the pipes or over the heat-exchanging surface of a heat exchanger to reduce the heat-exchanging efficiency of the heat exchanger. Prior art system for preventing such biological troubles disclosed in USP 4,453,953 and Japanese Patent Publication (Kokoku) Nos. 55-61984, 61-11882, 61-11883 and 64-3157 pass an ozonous gas having a high ozone concentration intermittently for a short time at a time through a pipe to remove biological slime.

Industrial water, in general, contains several parts per million of organic pollutants and metal ions, which are highly reactive with ozone, and ozone is highly subject to self-decomposition when the hydrogenion activity of industrial water is pH 7 or above. Accordingly, most part of ozone to be mixed in industrial water is consumed in an ozone mixing device, such as an ejector, by reaction with pollutants and metal ions and self-decomposition.

A known microorganism removing method injects chlorine or a chloric chemical into industrial water to prevent the adhesion and propagation of microorganisms by the bactericidal action and weedicidal action of chlorine. In removing microorganisms by such a microorganism removing method, the chlorine concentration of industrial water, in general, is 1 ppm, which needs a large amount of chlorine and increases the operating cost. Furthermore, if industrial water containing chlorine is drained into water for public use, such as rivers or sea, the industrial water will cause environmental pollution. Accordingly, such industrial water must be treated by a wastewater treatment system before draining the same, which, however, is very expensive.

A microorganism removing method proposed to eliminate those disadvantages of the foregoing microorganism removing method uses ozone, which has bactericidal and weedicidal actions higher than those of chlorine and decomposes into harmless oxygen in a relatively short time in water. This microorganism removing method is effective on preventing the adhesion and propagation of microorganisms on pipes for passing cooling water when ozone is supplied continuously into cooling water so that the effective ozone concentration of cooling water is on the order of 0.1 ppm. However, as mentioned above, since ozone decomposes in a relatively short time in water, ozone needs to be supplied into cooling water so that the ozone concentration of cooling water is on the order of 0.5 ppm, which is far greater than the effective ozone concentration. Since the price of ozone is about four times that of chlorine, the use of ozone is economically difficult and the microorganism removing method using ozone has not been widely applied to practical use.

An invention proposed in Japanese Patent Publication (Kokoku) No. 62-10714 to solve those problems is intended to extend the life of ozone in water by supplying an acid, such as carbonic acid, chloric acid or sulfuric acid, from an acid source into cooling water containing ozone supplied intermittently from an ozone source.

An invention proposed in U.S. Pat. No. 4,453,953 and Japanese Patent Laid-open (Kokai) No. 55-61983 provide a microorganism removing method that reduces the necessary quantity of ozone, enhances the economic effect of ozone and prevents environmental pollution by periodically supplying an ozonous gas having a high ozone concentration into water.

Figure 1:
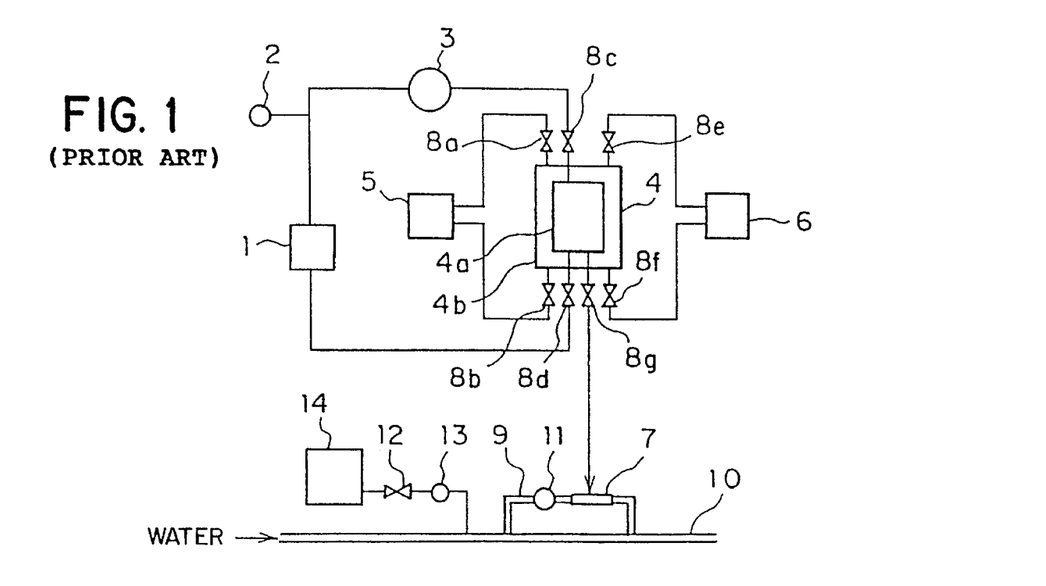
FIG. 1 is a typical, diagrammatic view of a prior art organic deposition preventing system.

Referring to FIG. 1 showing a prior art organic deposition preventing system disclosed in Japanese Patent Publication (Kokoku) No. 62-10714, there are shown an ozonizer 1, an oxygen source 2 from which oxygen is supplied to the ozonizer 1, an ozone adsorber 4, a circulating fan 3 provided on a line connecting the ozonizer 1 to the ozone adsorber 4, a cooling medium supply unit 5 for supplying a cooling medium to the adsorber 4 to cool the same, a heating medium supply unit 6 for supplying a heating medium to the ozone adsorber 4 to heat the same, a water-jet ejector 7 which desorbs ozone from the ozone adsorber 4 under reduced pressure and mixes the desorbed ozone in cooling water, selector valves 8a to 8g, an ejector driving water line 9 connected to the water-jet ejector 7, a cooling water line 10 communicating with the ejector driving water line 9, an ejector driving pump 11 provided on the ejector driving water line 9, a solenoid valve 12, an acid tank 14, and a metering pump 13 for injecting an acid supplied from the acid tank 14 into the cooling water line 10. These components constitute an acid supply system.

The ozone adsorber 4 has an inner cylinder 4a and an outer cylinder 4b surrounding the inner cylinder 4a. The inner cylinder 4a is packed with an ozone adsorbent, such as silicagel, and the space between the inner cylinder 4a and the outer cylinder 4b is filled up with a heat medium, such as ethylene glycol or an alcohol. The circulating fan 3, the ozonizer 1 and the ozone adsorber 4 are arranged in that order to form a circulating system, and the oxygen source 2 is connected to the circulating system.

The operation of the organic deposition preventing system will be described hereinafter. The organic deposition preventing system is capable of ozone adsorbing operation and ozone desorbing operation.

In the ozone adsorbing operation, oxygen is supplied into the circulating system from the oxygen source 2 so that the pressure in the circulating system is constant. Normally, the pressure in the circulating system is 1.5 kg/cm². The selector valves 8c and 8d are open. Oxygen is circulated through the circulating system by the circulating fan 3, part of the oxygen flowing through the discharge gaps of the ozonizer 1 is ozonized by silent discharge. An ozonous gas containing ozone is supplied into the ozone adsorber 4. Then, the ozone adsorbent contained in the ozone adsorber 4 adsorbs ozone selectively, and the oxygen is returned through the selector valve 8c to a return line connected to the circulating fan 3. The oxygen source 2 replenishes the circulating system with oxygen of an amount corresponding to the amount of oxygen converted into ozone. The ozone adsorbent is cooled by the cooling medium supplied from the cooling medium supply unit 5 to a temperature of −30° C. or below, because the ozone adsorbing capacity of the ozone adsorbent is greatly dependent on temperature; that is, the ozone adsorbing capacity of the ozone adsorbent increases when the temperature thereof is raised, and decreases when the temperature thereof is lowered.

In the ozone desorbing operation, when the ozone adsorbent contained in the ozone adsorber 4 is nearly saturated with ozone, the ozone desorbing operation is started. During the ozone desorbing operation, the ozonizer 1, the circulating fan 3 and the cooling medium supply unit 5 are stopped, the selector valves 8a, 8b, 8c and 8d are closed, the heating medium supply unit 6, the water-jet ejector 7 are started, and the selector valves 8e, 8f and 8g are opened. Then, the ozone adsorbent is heated by the heat supplied from the heating medium supply unit 6 to promote the desorption of ozone from the ozone adsorbent. Then, the water-jet ejector 7 sucks the ozone from the ozone adsorber 4 under reduced pressure, mixes the ozone with water therein and delivers ozone-containing water into the cooling water line 10 to suppress organic deposition in the cooling water line 10. During the suction of ozone under pressure, the internal pressure of the ozone adsorber 4 is about −70 cmHg.

When the organic deposition preventing system is set for the ozone desorbing operation by closing the selector valves 8a, 8b, 8c and 8d, opening the selector valves 83 and 8f and starting the heating medium supply unit 6, the ejector driving pump 11 is started and the solenoid valve 12 is opened in synchronism with the start of the ejector driving pump 11, the metering pump 13 starts supplying the acid, the selector valve 8g is opened after the metering pump 13 has started, and the organic deposition preventing system starts supplying ozone into the cooling water line 10. After the completion of the ozone desorbing operation, the solenoid valve 12 is closed, the metering pump 13 is stopped to stop supplying the acid, the selector valves 8e, 8f and 8g are closed, the ejector driving pump 11 is stopped, and then the ozone adsorbing operation is started again. Thus, the ozone adsorbing operation and the ozone desorbing operation are repeated alternately.

When ozone is injected in an ozone concentration of 10 ppm into cooling water circulating through the cooling water line 10, the ozone concentration decreased to 1 ppm in two minutes when the hydrogen-ion activity of the cooling water is on the order of pH 8, whereas the ozone concentration decreased to 6.7 ppm and 7.1 ppm in two minutes when the hydrogenion activity of the cooling water was pH 6 and pH 7, respectively. Such a high effective ozone concentration has a high bactericidal effect and hence a high organic deposition preventing effect.

Figure 2:
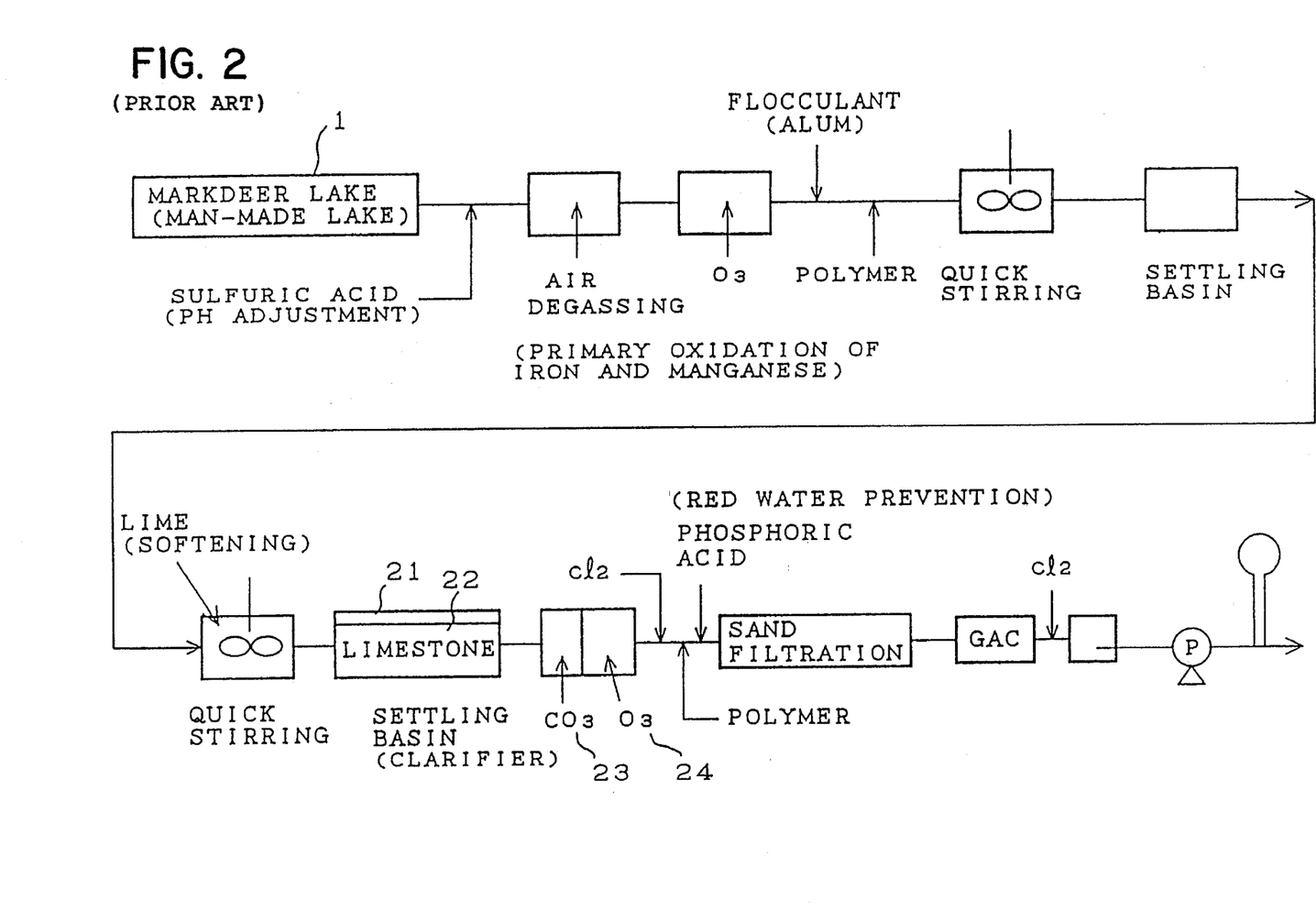
FIG. 2 is a flow chart of a prior art method of regulating the pH of industrial water by carbon dioxide gas.

Incidentally, another method of regulating the pH of cooling water uses carbon dioxide gas. FIG. 2 is a flow chart of a prior art pH regulating method using carbon dioxide gas applied to the Oklahoma State Water Purifying Plant, U.S.A. started its operation in July, 1988. This pH regulating method is described in Tomio Deguchi, "Advanced Water Purifying Technology Using Ozone", pp. 286–287. This prior art pH regulating method purifies foul water in a sedimentation basin 21 containing limestone 22, i.e., an alkaline substance, regulates the pH of the purified water (neutralization) by carbon dioxide gas 23, i.e., an acidic substance, and then blows an ozonous gas 24 into the neutralized water.

Figure 3:
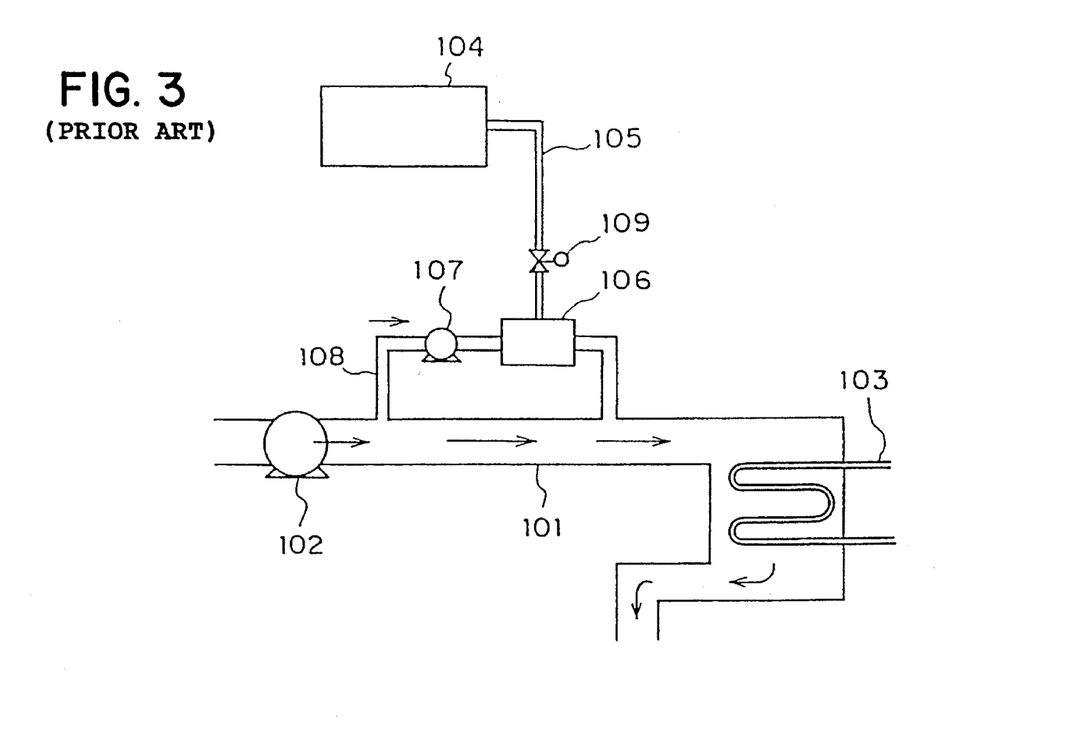
FIG. 3 is a typical diagrammatic view of a prior art microorganism removing system.

FIG. 3 shows a microorganism removing system for carrying out a microorganism removing method disclosed in Japanese Patent Laid-open (Kokai) No. 55-61983. Referring to FIG. 3, cooling water supplied to a cooling water line 101 by a water pump 102 is discharged after cooling a heat exchanger 103. An ozonizer 104 produces an ozonous gas of a high ozone concentration by converting oxygen or oxygen contained in air by silent discharge. The ozonous gas containing ozone is supplied through an ozone supply line 105 to a water-jet ejector 106, i.e., an ozone mixing device. The water-jet ejector 106 is driven by water discharged from an ejector driving pump 107 and supplied through a driving water supply line 108 connected to the water-jet ejector 106. The ozone supply line 105 is provided with a solenoid valve 109.

In operation, an ozonous gas is produced by the ozonizer 104 by subjecting oxygen or air to ozonization using silent discharge and, at the same time, the ejector driving pump 107 is driven, the solenoid valve 109 is opened to send the ozonous gas of a high ozone concentration through the ozone supply line 105 to the water-jet ejector 106 connected to the driving water supply line 108, and then the ozonous gas is blown in minute bubbles into cooling water supplied by the water pump 107. The ozonous cooling water having a high ozone concentration containing minute ozone bubbles is mixed in the cooling water flowing through the cooling water line 101. Then, the ozone contained in the cooling water destroys microorganisms adhering to the inner surface of the cooling water line 101 to prevent the cooling water line 101 to be clogged with microorganisms and to prevent the adhesion of organisms to the surface of the heat exchanger 103. The ozonous gas is injected periodically into the cooling water, for example, once a day for five minutes, so that the ozone concentration of the cooling water is maintained at a value in the range of 5 to 10 ppm. After the ozonous gas has been injected into the cooling water for five minutes, the solenoid valve 109 is closed, the ozonizer 104 is stopped, and then the ejector driving pump 107 is stopped.

Periodic injection of such ozonous water having a high ozone concentration into the cooling water removes microorganisms because of the following reasons. Since microorganisms propagate at an exponential rate, the propagation of microorganisms can be prevented by perfectly destroying the microorganisms in the initial stage of propagation by the ozonous water and periodically repeating destroying microorganisms in such a manner. Thus, troubles in the cooling water line attributable to the adhesion of microorganisms to the inner surface of the cooling water line can be prevented and organisms adhering to the surface of the heat exchanger can be removed.

As stated above, the prior art microorganism removing method supplies ozone periodically into the cooling water to maintain the ozone concentration of the cooling water in the range of 5 to 10 ppm. However, cooling water, in general, contains several parts per million of organic pollutants, suspended solids (SS) and inorganic ions including iron ions, which are highly reactive with ozone, and ozone is highly subject to self-decomposition when the hydrogen-ion activity of cooling water is pH 7 or higher. Accordingly, most part of ozone mixed in water by an ozone mixing device, such as an ejector, decomposes and hence it is difficult to obtain ozonous water of a high ozone concentration.

Since the prior art organic deposition preventing system as shown in FIG. 1 needs to supply a large quantity of acid solution to the cooling water, so that the cooling water contains a large quantity of inorganic ions, such as sulfate ions, chlorine ions or carbonic ions, in addition to hydrogen ions. Accordingly, effluence of a large quantity of such cooling water containing a large quantity of organic ions will cause environmental pollution. Furthermore, such cooling water forms scales on, for example, a heat exchanger to reduce the heat-exchanging efficiency of the heat exchanger and corrodes piping.

The organic deposition preventing effect of the prior art pH regulating method using carbon dioxide gas shown in FIG. 2 is not sufficiently high and needs a large quantity of carbon dioxide gas because the pH of all the cooling water must be regulated.

In the prior art microorganism removing system of FIG. 3, most part of the ozone injected into water is consumed by interaction of ozone and reactive substances contained in the water or by the self-decomposition of ozone and hence it is difficult to obtain ozonous water of a high ozone concentration.

SUMMARY OF THE INVENTION

In view of the foregoing, it is an object of the present invention to provide an organic decomposition preventing system capable of extending the life of ozone and of preventing the deposition of organisms in a water passage even if the water passage is long, without polluting the environment and without using a large quantity of carbon dioxide gas.

It is another object of the present invention to provide an organic decomposition preventing system capable of effectively injecting all the ozone stored in an ozone adsorber into industrial water.

It is a further object of the present invention to provide a microorganism removing method capable of suppressing the decomposition of ozone without using a large quantity of carbon dioxide gas, of providing ozonous water of a high ozone concentration and of satisfactorily removing microorganisms in a short time.

According to a first aspect of the present invention, for achieving the above-mentioned objects, there is provided an organic deposition preventing system comprising: an ozonizer for generating ozone; an ozone adsorber for storing ozone generated by the ozonizer; a mixing device for intermittently mixing an ozonous gas containing ozone desorbed from the ozone adsorber in water to destroy organisms propagated in the water; and a carbon dioxide gas supplying device for mixing carbon dioxide gas in the ozonous gas or for injecting carbon dioxide gas into the water in synchronism with the injection of the ozonous gas into the water.

According to a second aspect of the present invention, there is provided an organic deposition preventing system comprising the same components as the organic deposition preventing system in the first aspect, wherein carbon dioxide gas is supplied to the ozone adsorber in desorbing the ozone stored in the ozone adsorber to mix carbon dioxide gas and the ozonous gas.

According to a third aspect of the present invention, there is provided a microorganism removing method which removes microorganisms propagated in water by periodically injecting an ozonous gas of a high ozone concentration produced by an ozonizer by an ozone injecting device. Carbon dioxide gas is mixed in the ozonous gas of a high ozone concentration and the mixture of carbon dioxide gas and the ozonous gas is injected water or carbon dioxide gas is injected into water in synchronism with the injection of the ozonous gas into water.

As stated above, since the organic deposition preventing system in the first aspect of the present invention injects carbon dioxide gas into the industrial water together with the ozonous gas, the wasteful consumption of ozone in industrial water due to the interaction of ozone and reactive substances contained in the industrial water and self-decomposition of ozone can be suppressed, the life of ozone is extended and organic deposition in a long water passage can be prevented by a small quantity of carbon dioxide gas injected into the industrial water. Since carbon dioxide gas mixed in the industrial water escapes into the atmosphere when the industrial water is discharged and does not remain in the industrial water, the industrial water does not cause environmental pollution.

Furthermore, since the organic deposition preventing system in the second aspect of the present invention supplies carbon dioxide gas into the ozone adsorber by the mixing device, such as an ejector, when desorbing ozone stored in the ozone adsorber, the self-decomposition of ozone within the ozone adsorber and the associated pipes is suppressed, so that ozone stored in the ozone adsorber can be injected into the industrial water without being washed.

Still further, since the microorganism removing method in the third aspect of the present invention mixes both an ozonous gas of a high ozone concentration and carbon dioxide gas in part of the cooling water, or injects the ozonous gas into the cooling water in synchronism with the injection of carbon dioxide gas or immediately after the injection of carbon dioxide gas into the cooling water, a small quantity of carbon dioxide gas is able to suppress the consumption of ozone due to interaction of ozone and reactive substances and the self-decomposition of ozone effectively, so that ozonous water of a high ozone concentration can be obtained, which removes microorganisms satisfactorily in a short time.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Preferred embodiments of the invention will now be described in detail referring to the accompanying drawings, in which the component parts like or corresponding to those previously described with reference to FIG. 1 are designated by the same reference numerals and the description thereof will be omitted to avoid duplication.

FIRST EMBODIMENT

Figure 4:
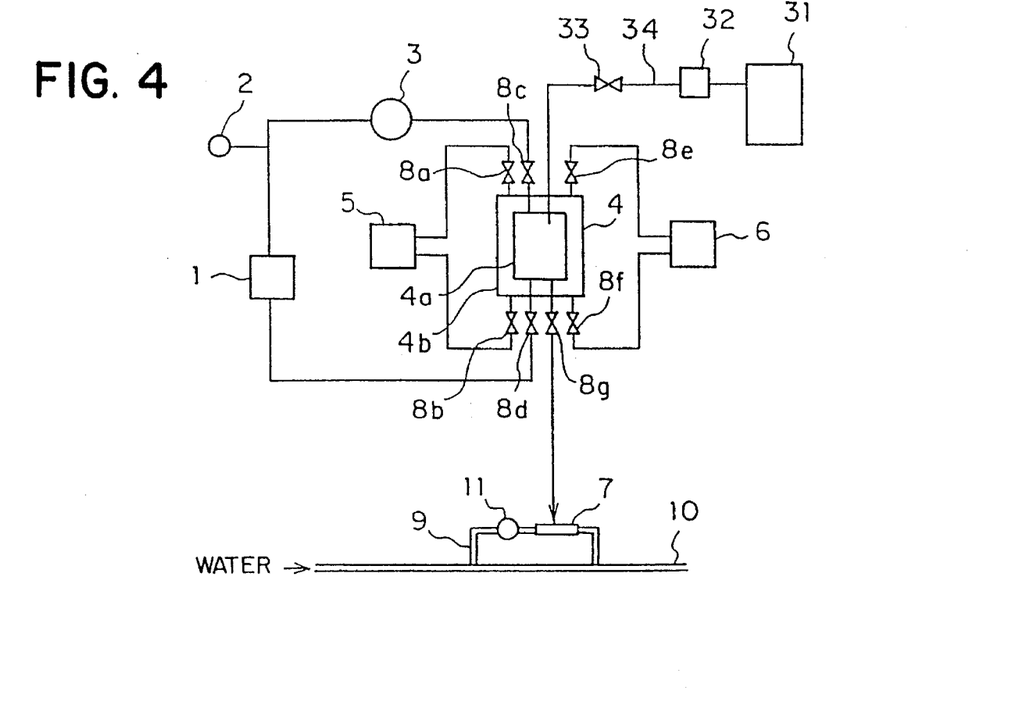
FIG. 4 is a typical, diagrammatic view of an organic deposition preventing system in a first embodiment by a first aspect of the present invention.

Referring to FIG. 4 showing an organic deposition preventing system in a first embodiment according to the present invention, there are shown an ozonizer 1 of an ozone generating unit, the ozone adsorber 4 of an ozone adsorbing unit, a water-jet ejector 7, i.e., a mixing device, a carbon dioxide gas source 31, such as a carbon dioxide gas cylinder or a liquid carbon dioxide cylinder, a flow regulator 32 for regulating the flow rate of carbon dioxide gas, and a solenoid valve 33 provided on a carbon dioxide gas supply line 34. The carbon dioxide gas supply line 34 is connected to the inner cylinder 4a of the ozone adsorber 4 to supply carbon dioxide into the ozone adsorber 4.

The operation of the organic deposition preventing system will be described hereinafter. When an ozone desorbing cycle is started after the completion of an ozone adsorbing cycle in which ozone is stored in the ozone adsorber 4, the ozonizer 1, a circulating fan 3 and a cooling medium supply unit 5 are stopped, and selector valves 8a, 8b, 8c and 8d are closed. Subsequently, a heating medium supply unit 6 and a pump 11 are started and selector valves 8e, 8f and 8g are opened to promote the desorption of ozone from the ozone adsorbent packed in the ozone adsorber 4 by heating the ozone adsorbent with heat supplied from the heating medium supply unit 6. Then, ozone desorbed from the ozone adsorbent packed in the ozone adsorber 4 is sucked by suction produced by the water-jet ejector 7 driven by water supplied by the pump 11. Meanwhile, the selector valves 8e, 8f and 8g and a solenoid valve 33 are opened to supply carbon dioxide gas from the carbon dioxide gas source 31 through a carbon dioxide gas supply line 34 into the ozone adsorber 4. The flow rate of carbon dioxide gas is regulated by the flow regulator 32. Then, the carbon dioxide gas supplied into the ozone adsorber 4 is mixed with ozone desorbed from the ozone adsorbent, and the mixed gas, i.e., a mixture of ozone and carbon dioxide gas, is sucked by the water-jet ejector 7 provided on an ejector driving water line 9 branched from a cooling water line 10. Then, the mixed gas consisting of ozone and carbon dioxide gas is injected in minute bubbles into part of cooling water flowing through the ejector driving water line 9 by the water-jet ejector 7, and the mixed gas mixes with the cooling water to produce ozonous water of a high ozone concentration. The ozonous water is returned to the cooling water line 10 and mixed in the cooling water flowing through the cooling water line 10. The mixed gas consisting of ozone and carbon dioxide gas is injected periodically into the cooling water, for example, once a day for five minutes, in order that the ozone concentration of the cooling water is in the range of 5 to 10 ppm.

When ozone adsorbed by the ozone adsorbent packed in the ozone adsorber 4 is desorbed from the ozone adsorbent, an ozonous gas of a high ozone concentration on the order of several tens percent is produced. It occurs that ozone contained in such an ozonous gas of a high ozone concentration disappears by self-decomposition in the ozone adsorber 4 or in the piping. This organic deposition preventing system supplies carbon dioxide gas, i.e., an inactive substance, into the ozone adsorber 4 when desorbing ozone from the ozone adsorbent to suppress the consumption of ozone by self-decomposition in the ozone adsorber 4 and the piping, so that all the ozone stored in the ozone adsorber 4 is added effectively to the cooling water. When carbon dioxide gas is supplied into the ozone adsorber 4 so as to come into contact with the ozone adsorbent, the capacity of the heating medium supply unit 6 for heating the ozone adsorbent when desorbing ozone from the ozone adsorbent may be relatively small. Accordingly, facilities including the ozone adsorber 4 can be formed in a relatively small construction and the organic deposition preventing system is able to operate at a reduced operating cost, which is economically advantageous. Since the mixed gas of ozone and carbon dioxide gas is injected into part of the cooling water flowing through the ejector driving water line 9 branched from the cooling water line 10 by the water-jet ejector 7 provided on the ejector driving water line 9, the pH of the cooling water is reduced by a small quantity of carbon dioxide gas and thereby the consumption of ozone due to the self-decomposition of ozone and interaction of ozone and reactive substances contained in the cooling water can be suppressed, so that effect of ozone on preventing the deposition of organisms in a long water supply line is enhanced accordingly, and the organism deposition preventing effect of ozone continues for an extended period of time. Thus, the deposition of organisms in long water supply lines and in water supply lines in which water stays for a long time can be prevented.

Experiments conducted to demonstrate the effect of the present invention showed that, when ozone is injected into water in an ozone concentration of 10 ppm, the ozone concentration of water decreased to 1 ppm in two minutes after ozone had been injected into water, whereas the ozone concentration of water was as high as about 7 ppm two minutes after the injection of an ozonous gas of a high ozone concentration containing carbon dioxide in a carbon dioxide concentration of about 10% into water so that the ozone concentration of water is 10 ppm.

Carbon dioxide gas contained in the cooling water escapes into the atmosphere and no carbon dioxide gas remains in the cooling water when the cooling water supplied through the cooling water line 10 is exposed to the atmosphere when the same is used for cooling. If the carbon dioxide gas diffused into the atmosphere is recovered and used again, the carbon dioxide concentration of the atmosphere will not increase and the carbon dioxide gas will not cause environmental pollution. Since the mixture of ozone and carbon dioxide gas is injected into water in a short time, the quantity of carbon dioxide gas needed by the organic deposition preventing system in the first embodiment is smaller than that needed by the prior art organic deposition preventing system of FIG. 2 and, since the organic deposition preventing system in the first embodiment does not need the injection of an acid into water, which is essential to the prior art organic deposition preventing system of FIG. 1, the organic deposition preventing system in the first embodiment does not entail environmental pollution, does not corrode pipes for carrying water and prevents formation of scales on the heat exchanger.

SECOND EMBODIMENT

Figure 5:
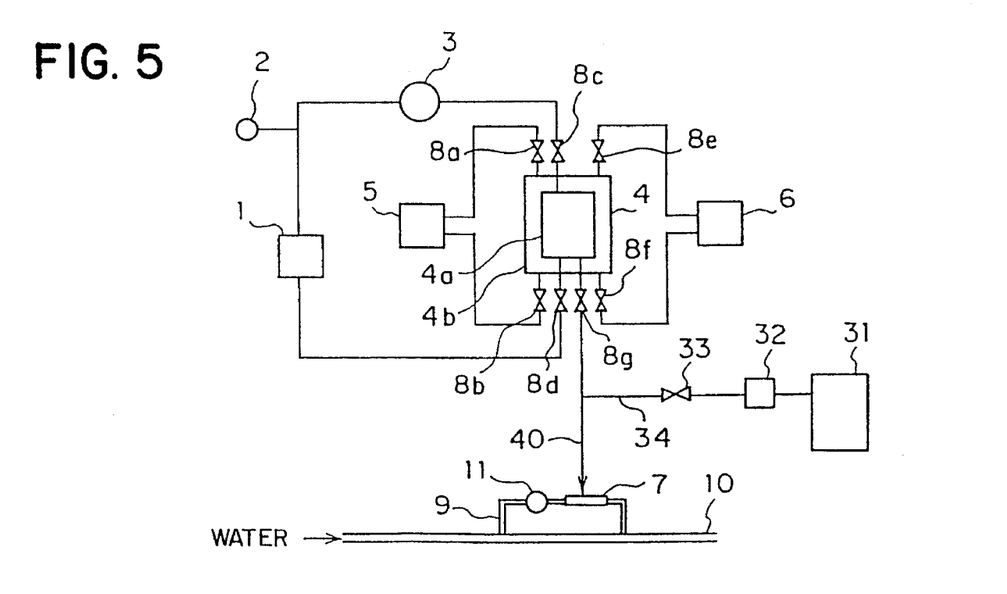
FIG. 5 is a typical, diagrammatic view of an organic deposition preventing system in a second embodiment by a second aspect of the present invention.

FIG. 5 shows an organic deposition preventing system in a second embodiment according to the present invention. While the organic deposition preventing system in the first embodiment supplies carbon dioxide gas into the ozone adsorber 4, the organic deposition preventing system in the second embodiment injects a mixed gas consisting of ozone and carbon dioxide gas into cooling water by the same method as that employed in the first embodiment. The organic deposition preventing system in the second embodiment has a carbon dioxide gas supply line 34 has a carbon dioxide gas supply line 34 having one end connected to a carbon dioxide gas source 31 and the other end connected to an ozone supply line 40 through which ozone desorbed from the ozone adsorbent of an ozone adsorber 4 is supplied to a water-jet ejector 7. This organic deposition preventing system, similarly to the organic deposition preventing system in the first embodiment, is capable of suppressing the consumption of ozone in water due to the interaction of ozone and reactive substances contained in water and the self-decomposition of ozone by using a relatively small quantity of carbon dioxide gas, of extending the life of ozone and of preventing the deposition of organisms in a long water supply line. The organic deposition preventing system does not entail environmental pollution.

THIRD EMBODIMENT

Figure 6:
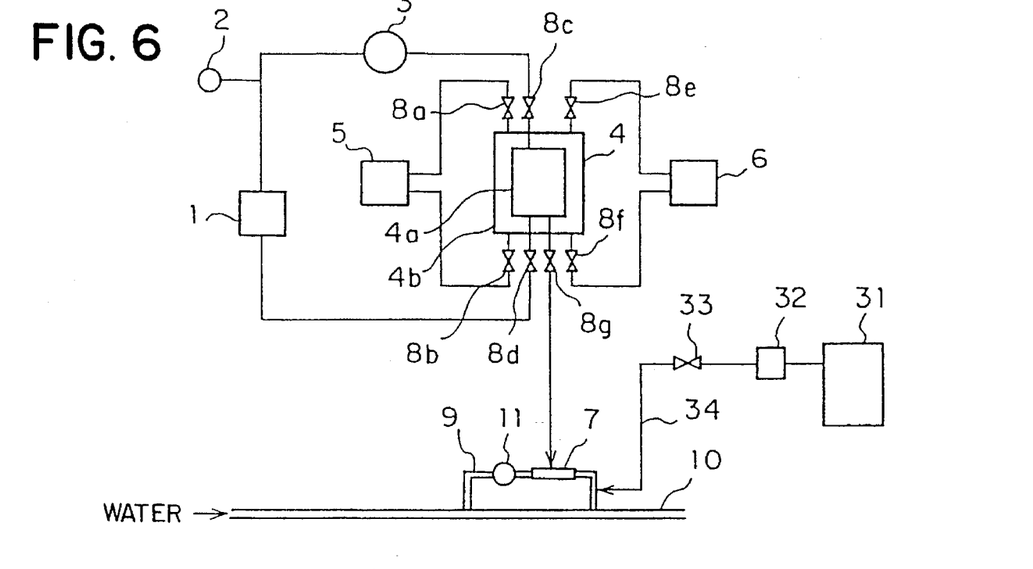
FIG. 6 is a typical, diagrammatic view of an organic deposition preventing system in a third embodiment by the second aspect of the present invention.

FIG. 6 shows an organic deposition preventing system in a third embodiment according to the present invention. As shown in FIG. 6, a water-jet ejector 7 is provided on an ejector driving water line 9 branched from a cooling water line 10, and a carbon dioxide supply line 34 has one end connected to a carbon dioxide source 31 and the other end connected to the ejector driving water line 9 at a position behind the water-jet ejector 7 with respect to the flowing direction of ejector driving water to supply carbon dioxide gas into cooling water in synchronism with the injection of ozone into the cooling water by the water-jet ejector 7. The organic deposition preventing system, similarly to the foregoing organic deposition preventing systems in the first and second embodiments, is capable of suppressing the consumption of ozone due to the interaction of ozone and reactive substances contained in the cooling water and the self-decomposition of ozone, of extending the life of ozone and of preventing the deposition of organisms in a long water supply line. Furthermore, the organic deposition preventing system does not entail environmental pollution. Carbon dioxide gas need not necessarily be injected into the cooling water in perfect synchronism with the injection of ozone into the cooling water; the injection of carbon dioxide gas into the cooling water may be started somewhat before starting the injection of ozone into the cooling water or may be stopped somewhat after stopping the injection of ozone into the cooling water. The solenoid valves of the organic deposition preventing system are controlled by a controller, not shown.

FOURTH EMBODIMENT

Figure 7:
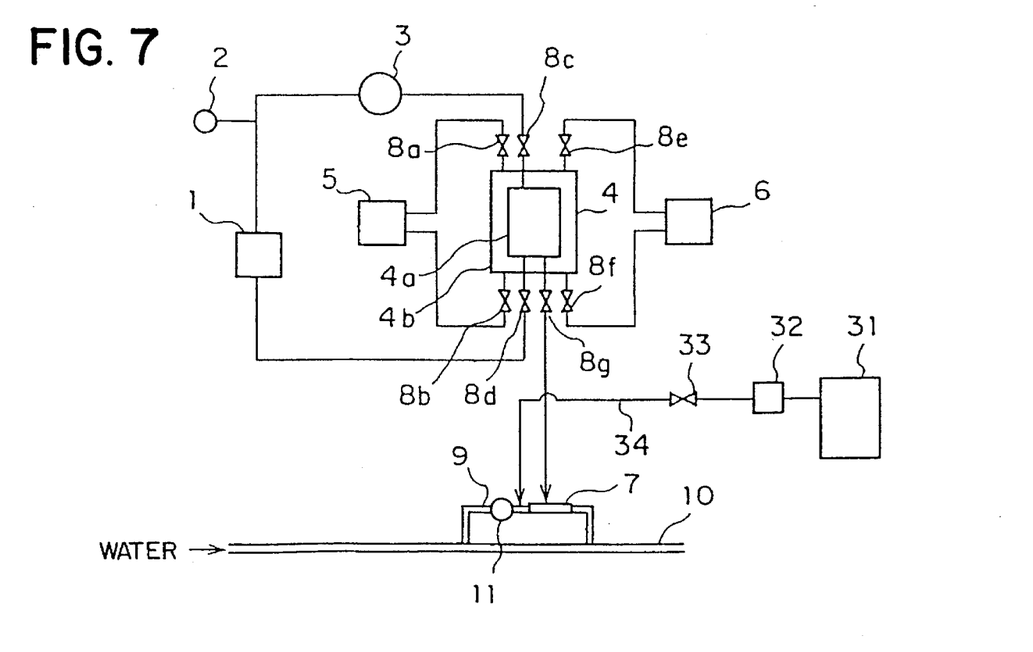
FIG. 7 is a typical, diagrammatic view of an organic deposition preventing system in a fourth embodiment by the second aspect of the present invention.

FIG. 7 shows an organic deposition preventing system in a fourth embodiment according to the present invention. As shown in FIG. 7, a carbon dioxide gas supply line 34 is connected to an ejector driving water supply line 9 at a position between a pump 11 and a water-jet ejector 7 provided on the ejector driving water supply line 9, namely, a position before an ozone injecting position, to inject carbon dioxide gas into cooling water immediately before injecting ozone into the cooling water in synchronism with the injection of ozone into the cooling water by the same method as that employed in the first embodiment. The effect of the fourth embodiment is the same as that of the third embodiment.

Although the addition of a small quantity of carbon dioxide gas to the cooling water is sufficiently effective, the greater the quantity of carbon dioxide gas added to the cooling water, the higher is the effect on the suppression of the decomposition of ozone and the extension of ozone in the cooling water. However, since the addition of carbon dioxide gas to the ozonous gas of a high ozone concentration produced by desorbing ozone from the ozone adsorbent reduces the ozone concentration of the ozonous gas, a preferable carbon dioxide gas concentration of the ozonous gas is in the range of several percent to several tens percent.

Although a carbon dioxide gas cylinder or a liquid carbon dioxide cylinder is employed as the carbon dioxide gas source 31 in the foregoing embodiments, carbon dioxide gas recovered from the atmosphere by an industrial carbon dioxide gas recovery means, such as a carbon dioxide adsorbing method using a carbon dioxide adsorbent, such as molecular sieve, or a subzero cooling method may be used for the same effect.

Although the foregoing embodiments have been described as applied to the cooling water supply line, the present invention is not limited thereto in its application; the present invention is applicable to preventing the deposition of organisms in other water supply lines and to suppressing the consumption of ozone by the interaction of ozone and reactive substances contained in water and the self-decomposition of ozone, and to extend the life of ozone by adding a small quantity of carbon dioxide gas together with ozone to the water.

As stated above, the organic deposition preventing system of the present invention comprises the ozonizer for generating ozone, the ozone adsorber for storing the ozone generated by the ozonizer, a mixing device for mixing an ozonous gas obtained by desorbing ozone stored in the ozone adsorber intermittently in water to destroy organisms propagated in the water, and the carbon dioxide supplying device for mixing carbon dioxide gas in the ozonous gas before injecting the ozonous gas into the water or injecting carbon dioxide gas into the water in synchronism with the injection of the ozonous gas into the water. Accordingly, the organic deposition preventing system does not entail environmental pollution, and is capable of suppressing the consumption of ozone in the water due to the interaction of ozone and reactive substances contained in the water and the self-decomposition of ozone, of extending the life of ozone and of preventing the deposition of organisms in a long water supply line.

Since carbon dioxide gas is supplied to the ozone adsorber to mix carbon dioxide gas in ozone when desorbing ozone from the ozone adsorbent of the ozone adsorber, the self-decomposition of ozone in the ozone adsorber and the associated piping can be suppressed and all the ozone stored in the ozone adsorber can be effectively injected into water.

FIFTH EMBODIMENT

Figure 8:
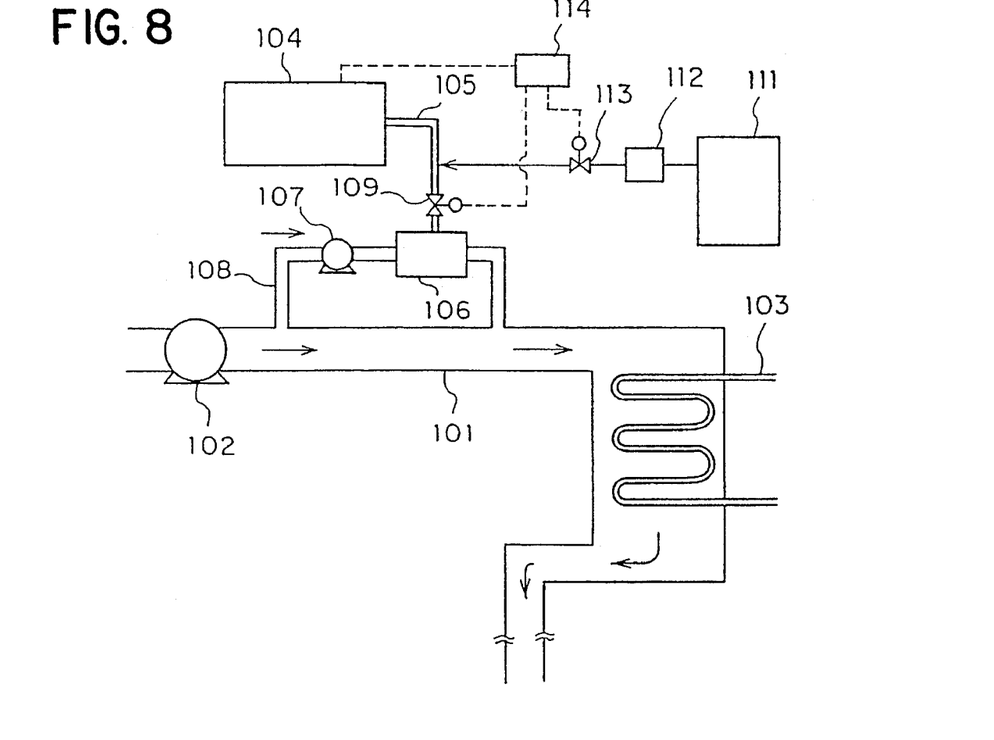
FIG. 8 is a typical, diagrammatic view of a microorganism removing system in a fifth embodiment by a third aspect of the present invention.

A microorganism removing method in accordance with the present invention will be described hereinafter with reference to FIG. 8 showing a microorganism removing system in a fifth embodiment according to the present invention.

Referring to FIG. 8, there are shown a carbon dioxide gas source 111, such as a carbon dioxide gas cylinder or a liquid carbon dioxide cylinder, for supplying carbon dioxide gas, a flow regulator 112 for regulating the flow rate of carbon dioxide gas, a second solenoid valve 113 for controlling the supply of carbon dioxide, and a controller 114 for controlling an ozonizer 104, a pump 107, a solenoid valve 109 and the second solenoid valve 113.

Cooling water pumped by a water pump 102 flows through a cooling water supply line 101, cools a heat exchanger 103 and is drained from the heat exchanger 103. Ozone is injected into the cooling water by the following procedure. Part of oxygen contained in the atmosphere is ozonized through silent discharge by the ozonizer 104 to produce an ozonous gas of a high ozone concentration. At the same time or immediately before the ozonizing operation of the ozonizer 104, the pump 107 is started and the solenoid valve 109 is opened to make the ozonous gas of a high ozone concentration flow through an ozonous gas supply line 105. Meantime, the second solenoid valve 113 is opened to send carbon dioxide gas from the carbon dioxide source 111 through the flow regulator 112 into the ozonous gas supply line 105 to mix carbon dioxide gas in the ozonous gas. A mixed gas consisting of the ozonous gas and carbon dioxide gas is sent to a water-jet ejector 106 provided on an ejector driving water line 108 branched from the cooling water supply line 101, the mixed gas is injected in minute bubbles into the cooling water pumped by the pump 107 and flowing through the ejector driving water line 108 by the water-jet ejector 106. The ozonous water of a high ozone concentration containing minute bubbles of the mixed gas consisting of ozone and carbon dioxide gas joins the most part of the cooling water flowing through the cooling water supply line 101. The mixed gas destroys organisms adhering to the inner surface of the pipes of the cooling water supply line 101 to prevent troubles which might be caused by the organisms and prevents the adhesion of organisms contained in the cooling water to the surface of the heat exchanger 103. The mixed gas consisting of the ozonous gas of a high ozone concentration and carbon dioxide is supplied periodically, for example, once a day for five minutes at a time, into the cooling water so that the ozone concentration of the cooling water is in the range of 5 to 10 ppm. After the completion of an ozone injecting cycle of five minutes for injecting the mixed gas into the cooling water, the solenoid valve 109 and the second solenoid valve 113 are closed and the operation of the ozonizer 104 is stopped, and then the pump 107 is stopped until the next ozone injecting cycle.

Since the mixed gas consisting of the ozonous gas and carbon dioxide gas is injected periodically into part of the cooling water flowing through the ejector driving water line 108 branched from the cooling water supply line 101 by the water-jet ejector 107 provided on the ejector driving water line 108, the pH of the cooling water can be reduced by supplying a small quantity of carbon dioxide gas, the consumption of ozone in the water-jet ejector 107 and the ejector driving water line 108 due to the interaction of ozone and reactive substances contained in the cooling water and the self-decomposition of ozone can be suppressed and ozonous water of a high ozone concentration can be injected into the cooling water flowing through the cooling water supply line 101. Since the ozonous water of a high ozone concentration has high bactericidal effect, microorganisms can be effectively removed in a short time.

SIXTH EMBODIMENT

Figure 9:
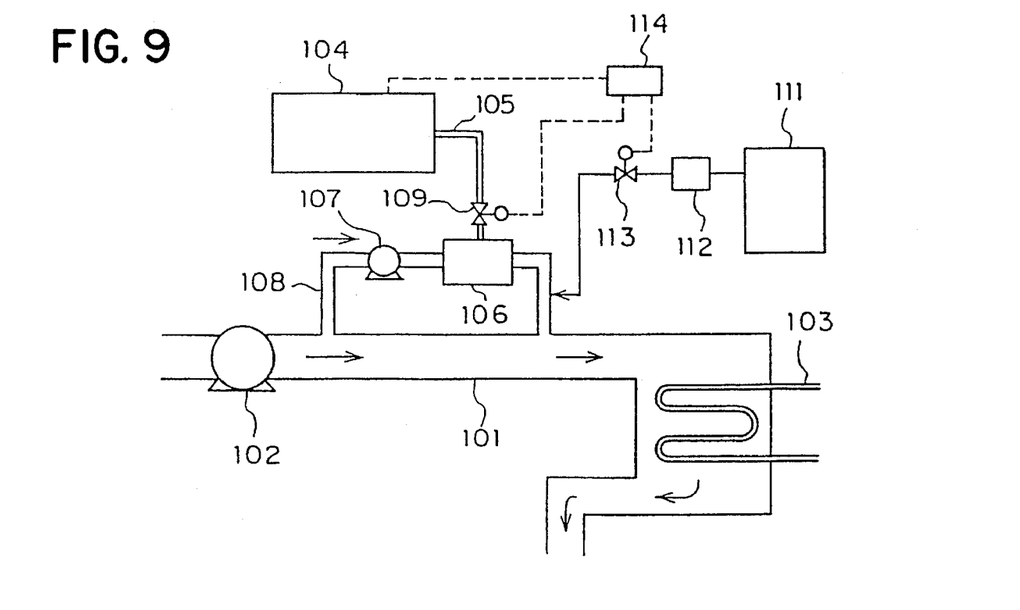
FIG. 9 is a typical, diagrammatic view of a microorganism removing system in a sixth embodiment by the third aspect of the present invention.

FIG. 9 shows a microorganism removing system in a sixth embodiment according to the present invention. This microorganism removing system injects carbon dioxide gas into cooling water by the same method as the fifth embodiment immediately after and in synchronism with the injection of ozone into the cooling water. A water-jet ejector 106 is provided on an ejector driving water line 108 branched from a cooling water supply line 101, and a carbon dioxide gas supply line is connected to the ejector driving water supply line 108 at a position behind the water-jet ejector 106 with respect to the flowing direction of the cooling water. This embodiment, similarly to the fifth embodiment, is capable of effectively suppressing the consumption of ozone due to the interaction of ozone and reactive substances contained in the cooling water and the self-decomposition of ozone by a smell quantity of carbon dioxide. Carbon dioxide gas need not necessarily be injected in perfect synchronism with the injection of ozone into the cooling water by the water-jet ejector 106; the injection of carbon dioxide gas into the cooling water may be started somewhat before starting the injection of ozone into the cooling water or may be stopped somewhat after stopping the injection of ozone into the cooling water.

SEVENTH EMBODIMENT

Figure 10:
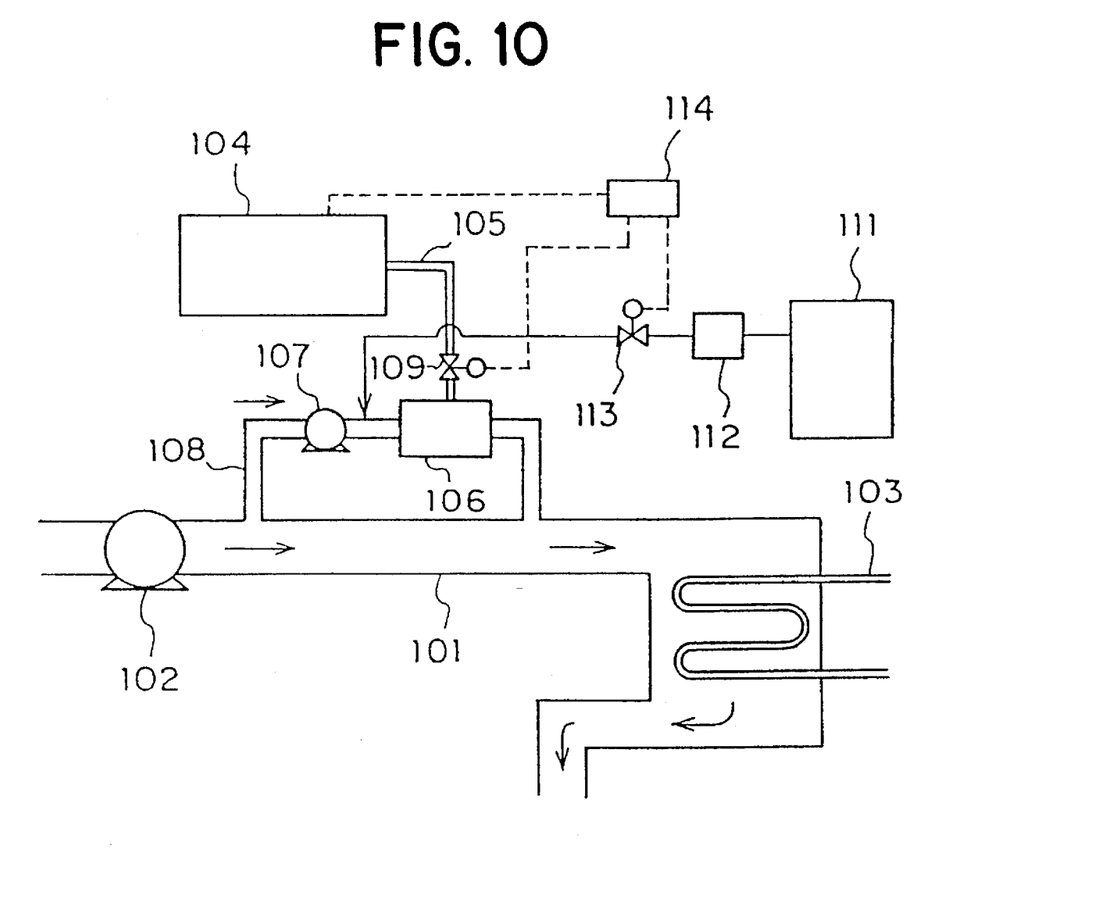
FIG. 10 is a typical, diagrammatic view of a microorganism removing system in a seventh embodiment by the third aspect of the present invention.

FIG. 10 shows a microorganism removing system in a seventh embodiment according to the present invention. This microorganism removing system injects carbon dioxide gas into cooling water by the same method as the fifth embodiment immediately before and in synchronism with the injection of ozone into the cooling water. A water-jet ejector 106 is provided on an ejector driving water line 108 branched from a cooling water supply line 101, and a carbon dioxide gas supply line is connected to the ejector driving water line at a position before the water-jet ejector 106. The effect of the seventh embodiment is the same as that of the sixth embodiment.

Although addition of a very small quantity of carbon dioxide gas to the cooling water is sufficiently effective, the greater the quantity of carbon dioxide added to the cooling water, the higher is the effect of carbon dioxide gas on the reduction of the pH of the cooling water, and hence ozonous water of a high ozone concentration can be supplied to the cooling water. However, since the ozone concentration of the ozonous gas of a high ozone concentration decreases when carbon dioxide gas is added to the cooling water, a preferable carbon dioxide gas concentration of the ozonous gas is in the range of several percent to several tens percent.

Conditions for injecting ozone into the cooling water are dependent on the type of microorganisms contained in the cooling water, the temperature of the cooling water, and the composition and quantity of organic pollutants contained in the cooling water. Generally, ozone is injected into the cooling water once every period in the range of half day to three days for a time in the range of three minutes to ten minutes so that the ozone concentration of the cooling water is in the range of several parts per million to several tens parts per million.

Although a carbon dioxide gas cylinder or a liquid carbon dioxide cylinder is employed as the carbon dioxide gas source in the foregoing embodiments, carbon dioxide gas recovered from the atmosphere by an industrial carbon dioxide recovery means, such as a carbon dioxide absorbing method using a carbon dioxide adsorbent, such as molecular sieve, or a subzero cooling method may be used for the same effect.

Although the foregoing embodiments have been described as applied to the cooling water supply line, the present invention may be applied to water supply lines other than the cooling water supply line. The injection of carbon dioxide gas, even if only a small quantity of carbon dioxide gas, into water together with ozone suppresses the consumption of ozone due to the interaction of ozone and reactive substances contained in the water and the self-decomposition of ozone, and extends the life of ozone.

As is apparent from the foregoing description, the present invention provides a method of removing microorganisms propagated in water by periodically injecting an ozonous gas of a high ozone concentration produced by an ozonizer into water. Since a mixed gas consisting of the ozonous gas and carbon dioxide gas is injected into water or the ozonous gas and carbon dioxide gas are injected synchronously into water, the consumption of ozone due to the interaction of ozone and reactive substances contained in the water and the self-decomposition of ozone can be suppressed by supplying only a small quantity of carbon dioxide gas into the water, ozonous water of a high ozone concentration can be produced and hence microorganisms can be removed perfectly in a short time.

What is claimed is:

1. A microorganism removing method comprising the steps of:

causing water to flow through a water pipe;

causing water to flow through a branch water pipe branched from the water pipe;

generating ozone by an ozonizer;

storing the ozone in ozone adsorbent contained in a single ozone adsorber by cooling the single ozone adsorber;

desorbing the ozone from the ozone adsorbent by heating the ozone adsorbent;

intermittently mixing the desorbed ozone with the water flowing through the branch water pipe; and mixing, in substantial synchronization with the intermittent mixing of the desorbed ozone with the water, carbon dioxide with the water flowing through the branch pipe, wherein the step of mixing carbon dioxide comprises the steps of:

intermittently sucking the ozonous gas desorbed from the ozone adsorbent and injecting the sucked ozonous gas into the water flowing through the branch water pipe;

supplying, in substantial synchronization with the intermittent sucking of the ozonous gas, the carbon dioxide into an ozonous gas supply pipe connected between the ozone adsorber and the branch water pipe, so that the carbon dioxide is mixed with the ozonous gas desorbed from the ozone adsorbent; and mixing the mixed gas including the ozonous gas and the carbon dioxide with the water in the branch water pipe.

2. A microorganism removing method comprising the steps of:

causing water to flow through a water pipe;

causing water to flow through a branch water pipe branched from the water pipe;

generating ozone by an ozonizer;

storing the ozone in ozone adsorbent contained in a single ozone adsorber by cooling the single ozone adsorber;

desorbing the ozone from the ozone adsorbent by heating the ozone adsorbent;

intermittently mixing the desorbed ozone with the water flowing through the branch water pipe; and mixing, in substantial synchronization with the intermittent mixing of the desorbed ozone with the water, carbon dioxide with the water flowing through the branch pipe, wherein the step of mixing carbon dioxide comprises the steps of:

intermittently sucking the ozonous gas desorbed from the ozone adsorbent;

injecting the sucked ozonous gas into a water-jet ejector inserted between an upstream portion and a downstream portion of the branch water pipe; and supplying, in substantial synchronization with the intermittent sucking of the ozonous gas, the carbon dioxide into the branch water pipe downstream of the water-jet ejector so that the carbon dioxide is mixed with the water in the branch water pipe after the ozonous gas is mixed with the water in the branch water pipe.

3. A microorganism removing method comprising the steps of;

causing water to flow through a water pipe;

causing water to flow through a branch water pipe branched from the water pipe;

generating ozone by an ozonizer;

storing the ozone in ozone adsorbent contained in a single ozone adsorber by cooling the single ozone adsorber;

desorbing the ozone from the ozone adsorbent by heating the ozone adsorbent;

intermittently mixing the desorbed ozone with the water flowing through the branch water pipe; and mixing, in substantial synchronization with the intermittent mixing of the desorbed ozone with the water, carbon dioxide with the water flowing through the branch pipe, wherein the step of mixing carbon dioxide comprises the steps of:

intermittently sucking the ozonous gas desorbed from the ozone adsorbent;

injecting the sucked ozonous gas into a water-jet ejector inserted between an upstream portion and a downstream portion of the branch water pipe; and supplying, in substantial synchronization with the intermittent sucking of the ozonous gas, the carbon dioxide into the branch water pipe upstream of the water-jet ejector so that the carbon dioxide is mixed with the water in the branch water pipe before the ozonous gas is mixed with the water in the water-jet ejector.

4. A microorganism deposition preventing system for removing microorganisms propagated in water conducted through a water pipe, comprising:

an ozonizer for generating ozone;

a single ozone adsorber in fluid communication with the ozonizer and having an inner cylinder and an outer cylinder, said inner cylinder being packed with ozone adsorbent for storing the ozone generated by the ozonizer when said single ozone adsorber is cooled, and the space between the inner cylinder and the outer cylinder being filled up with heating medium for desorbing the ozone from said ozone adsorbent to generate ozonous gas when said ozone adsorber is heated;

a heating source for intermittently heating the ozone adsorber to promote the desorbing of the ozone from the ozone adsorbent;

a branch pipe branched from said water pipe;

a water-jet ejector inserted at a portion of said branch pipe and having a port in fluid communication with the output pipe of said single ozone adsorber, for intermittently sucking the ozonous gas from said ozone adsorber under reduced pressure so that the sucked ozonous gas is mixed with the water in said water-jet ejector;

an ejector driving pump inserted in said branch pipe upstream of said water-jet ejector, for intermittently driving said water-jet ejector;

a carbon dioxide source for providing carbon dioxide in synchronization with the sucking of the ozonous gas from the ozone adsorber, said carbon dioxide mixing with the water flowing through said branch pipe so as to suppress the self-decomposition of ozone; and an ozonous gas supply pipe connected between the ozone adsorber and the water-jet ejector, and wherein the carbon dioxide source is connected to the ozonous gas supply pipe between the ozone adsorber and the water-jet ejector so that the carbon dioxide is mixed with the ozonous gas desorbed from the ozone adsorbent, wherein the water-jet ejector mixes the mixed gas including the ozonous gas and the carbon dioxide with the water.

5. A microorganism deposition preventing system for removing microorganisms propagated in water conducted through a water pipe, comprising:

an ozonizer for generating ozone;

a single ozone adsorber in fluid communication with the ozonizer and having an inner cylinder and an outer cylinder, said inner cylinder being packed with ozone adsorbent for storing the ozone generated by the ozonizer when said single ozone adsorber is cooled, and the space between the inner cylinder and the outer cylinder being filled up with heating medium for desorbing the ozone from said ozone adsorbent to generate ozonous gas when said ozone adsorber is heated;

a heating source for intermittently heating the ozone adsorber to promote the desorbing of the ozone from the ozone adsorbent;

a branch pipe branched from said water pipe;

a water-jet ejector inserted at a portion of said branch pipe and having a port in fluid communication with the output pipe of said single ozone adsorber, for intermittently sucking the ozonous gas from said ozone adsorber under reduced pressure so that the sucked ozonous gas is mixed with the water in said water-jet ejector;

an ejector driving pump inserted in said branch pipe upstream of said water-jet ejector, for intermittently driving said water-jet ejector; and a carbon dioxide source for providing carbon dioxide in synchronization with the sucking of the ozonous gas from the ozone adsorber, said carbon dioxide mixing with the water flowing through said branch pipe so as to suppress the self-decomposition of ozone, wherein the carbon dioxide source is connected to the branch pipe downstream of the water-jet ejector so that the carbon dioxide gas is mixed with the water after the ozonous gas is mixed with the water in the water-jet ejector.

6. A microorganism deposition preventing system for removing microorganisms propagated in water conducted through a water pipe, comprising:

an ozonizer for generating ozone;

a single ozone adsorber in fluid communication with the ozonizer and having an inner cylinder and an outer cylinder, said inner cylinder being packed with ozone adsorbent for storing the ozone generated by the ozonizer when said single ozone adsorber is cooled, and the space between the inner cylinder and the outer cylinder being filled up with heating medium for desorbing the ozone from said ozone adsorbent to generate ozonous gas when said ozone adsorber is heated;

a heating source for intermittently heating the ozone adsorber to promote the desorbing of the ozone from the ozone adsorbent;

a branch pipe branched from said water pipe;

a water-jet ejector inserted at a portion of said branch pipe and having a port in fluid communication with the output pipe of said single ozone adsorber, for intermittently sucking the ozonous gas from said ozone adsorber under reduced pressure so that the sucked ozonous gas is mixed with the water in said water-jet ejector;

an ejector driving pump inserted in said branch pipe upstream of said water-jet ejector, for intermittently driving said water-jet ejector; and a carbon dioxide source for providing carbon dioxide in synchronization with the sucking of the ozonous gas from the ozone adsorber, said carbon dioxide mixing with the water flowing through said branch pipe so as to suppress the self-decomposition of ozone, wherein the carbon dioxide source is connected to the branch pipe upstream of the water-jet ejector so that the carbon dioxide is mixed with the water before the ozonous gas is mixed with the water in the water-jet ejector.

* * * * *